Sept. 11, 1934.  C. S. BRAGG  1,973,043
PROCESS FOR THE PRODUCTION OF BRAKE DRUMS PROVIDED WITH FRICTION LININGS
Filed Jan. 10, 1931    3 Sheets-Sheet 1
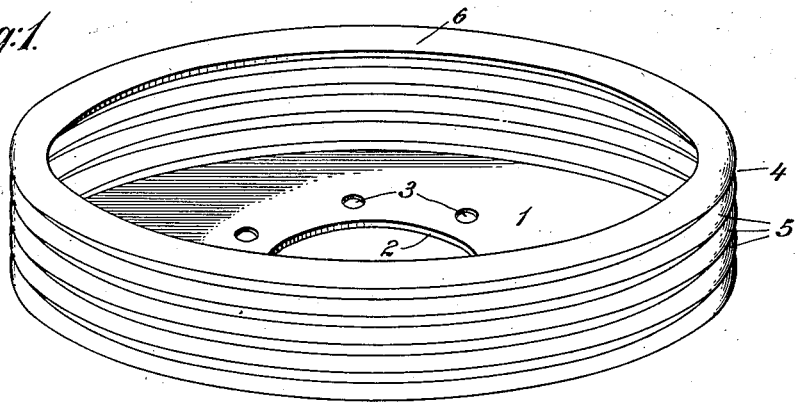
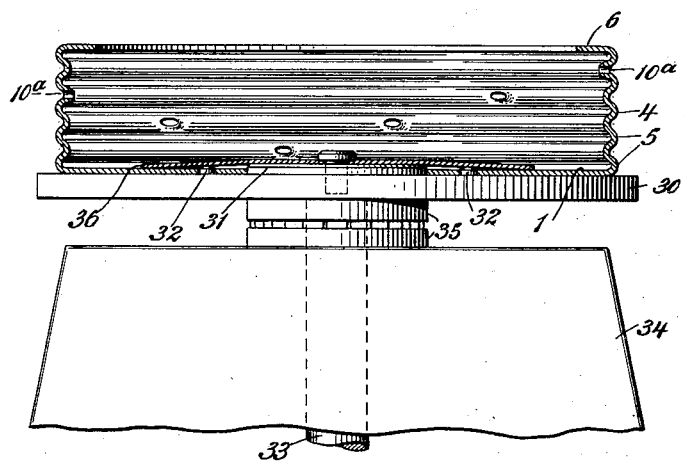
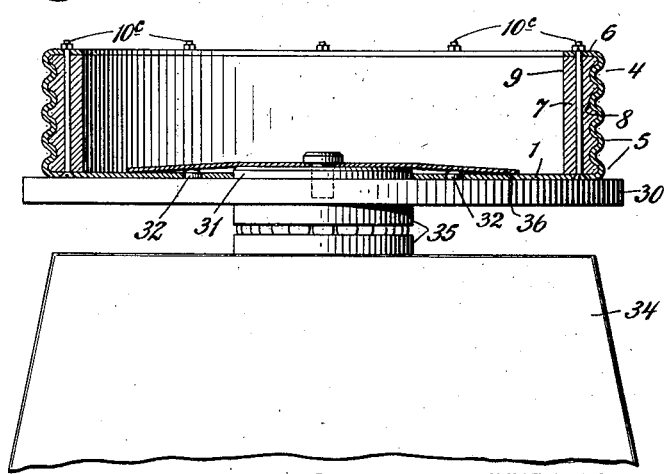

Sept. 11, 1934.  C. S. BRAGG  1,973,043
PROCESS FOR THE PRODUCTION OF BRAKE DRUMS PROVIDED WITH FRICTION LININGS
Filed Jan. 10, 1931  3 Sheets-Sheet 2
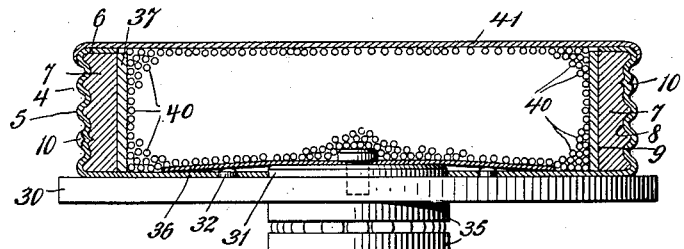
Fig. 4.
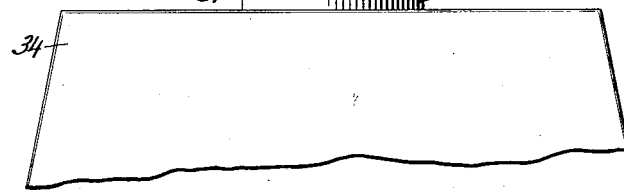
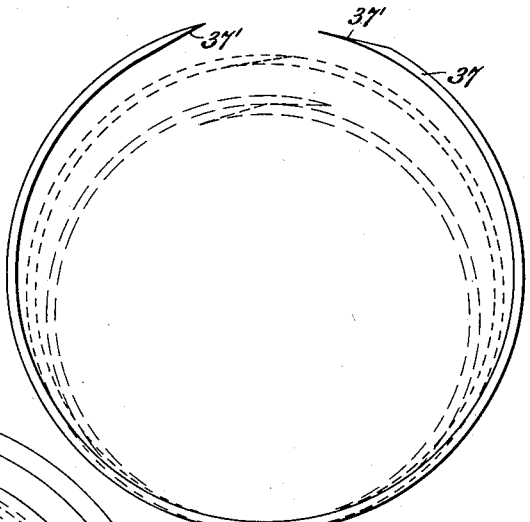
Fig. 5.
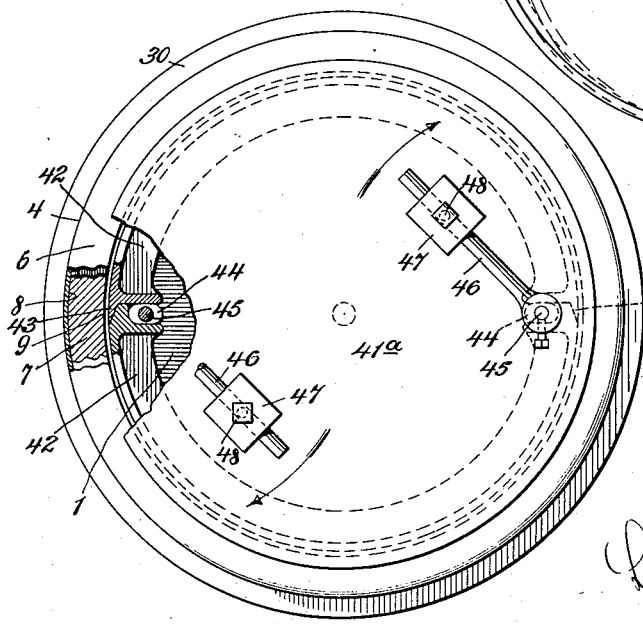
Fig. 6.
INVENTOR
Caleb S. Bragg
BY
Louis Revost Whitaker
ATTORNEY Sept. 11, 1934.  C. S. BRAGG  1,973,043
PROCESS FOR THE PRODUCTION OF BRAKE DRUMS PROVIDED WITH FRICTION LININGS
Filed Jan. 10, 1931   3 Sheets-Sheet 3
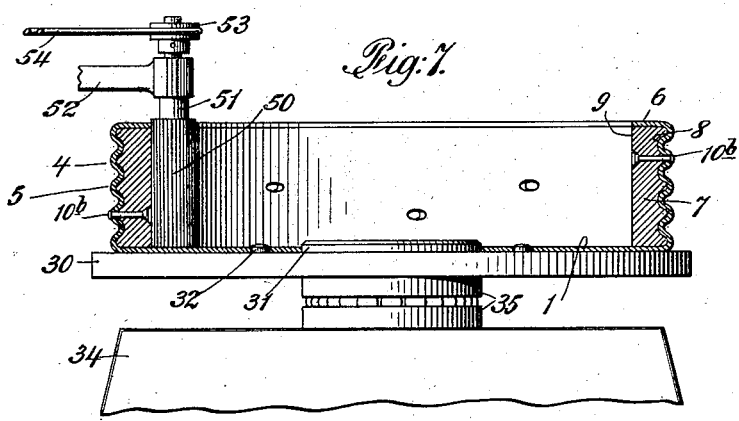
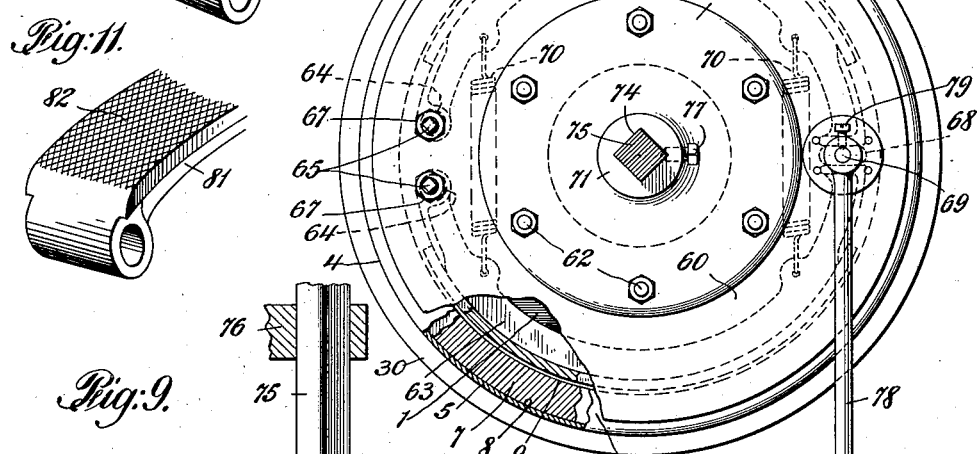
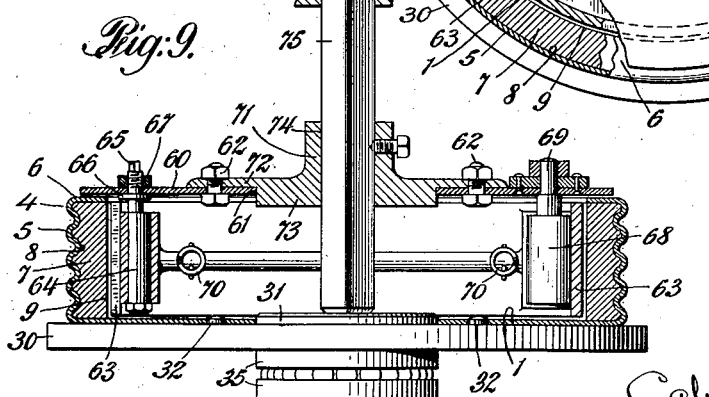
INVENTOR
Caleb S. Bragg
Louis Prevost Whitaker
ATTORNEY Patented Sept. 11, 1934

1,973,043

UNITED STATES PATENT OFFICE 1,973,043

PROCESS FOR THE PRODUCTION OF BRAKE DRUMS PROVIDED WITH FRICTION LININGS

Caleb S. Bragg, Palm Beach, Fla.

Application January 10, 1931, Serial No. 507,905

17 Claims. (Cl. 18—59)

My invention consists in the novel features hereinafter described, reference being had to the accompanying drawings which illustrate several ways in which my invention may be carried into effect, selected by me for purposes of illustration, and the said invention is fully disclosed in the following description and claims.

In the manufacture of brake mechanism for automotive vehicles, the braking elements ordinarily comprise a brake drum of metal provided with an annular braking flange, and internally expanding shoes which are provided with friction linings of either molded or woven types, fastened usually by means of rivets to the shoes. In external contracting brake mechanisms, exterior shoes, or a brake band, similarly provided with friction linings of the woven or molded type, have been employed, but these exterior contracting brake mechanisms have been almost entirely abandoned in the automotive vehicle industry.

In my former application for Letters Patent of the United States filed on December 31st, 1930, and given Serial No. 505,821, I have disclosed a brake drum provided with an annular braking flange which is corrugated or otherwise distorted to provide increased strength and to prevent distortion from heat of friction, or from the pressure of the brake shoes, and to prevent scoring of the braking flange, which flange in the preferred form of my invention is provided with a friction lining on its inner face, the inner face of the lining being concentric with the axis of rotation of the drum, and is engaged by the internal expanding brake shoes, preferably having plain metallic friction surfaces, the outer face of the lining fitting the corrugated, or otherwise distorted inner face of the braking flange. The lining is held by or secured to the braking flange in any desired manner and rotates therewith.

My present invention consists in a process whereby the lining is molded or formed in situ within the particular drum with which it is to be used, and permanently united to a face of the drum flange. The drum flange is preferably provided at its outer edges with inwardly extending annular lips or flanges which engage the lining and may determine its thickness, and the lining may be likewise permanently united to the inner face of said lips. One of said inwardly extending lips or flanges provide means for attaching the drum to the rotary part with which it is to be used, which attaching portions are in the preferred form of my invention integral with the steel drum flange. It follows, therefore, that the lining when cast or molded in the drum becomes in effect an integral part of the drum structure and cannot be removed therefrom without destroying the lining. According to my present invention, the lining may be subjected to pressure, to change of temperature or to other hardening treatment, in situ in the drum, to consolidate, solidify or harden the material of the lining.

The present methods of manufacturing linings require a very large investment for machinery for quantity production. In the manufacture of molded linings it is necessary to provide a press or presses, and large numbers of individual molds, usually provided with means for applying heat treatment to the linings, which necessitate the linings remaining in the mold for a considerable time. In the case of woven linings, machinery must be provided for carding, spinning and weaving, together with apparatus for treating or impregnating the fabric, and heating it for drying and hardening the same. Metal linings require molds to cast them. Both molded and woven types of lining must thereafter be riveted or otherwise attached to the shoes or brake bands at additional cost for labor.

By molding the lining in situ in the drum, the drum and its braking flange form part of the mold and the large number of separate stationary molds usually required to form the lining are dispensed with, with great resulting economy in the cost of machinery. Further, if the molded lining is subjected to heat treatment for vulcanization, induration or other purpose, the drum and lining therein may be passed through steam rooms or ovens or hot rooms on conveyors instead of carrying the heat to the presses or molds, as is now done. If the lining is to be of metal it may be cast into the drum without the use of molds. Furthermore, the lining is securely fastened and held against relative movement with respect to the drum without additional labor.

Another advantage of my invention is that the lining will accommodate variations in the braking flange of the drum, the inner or friction face of the lining being brought into coaxial relation with the drum so as to actually conform with the friction surface of the brake shoe. According to one form of my process, the final preparation of the friction surface of the lining is provided by rotation of the drum with respect to the identical brake shoes with which the drum is to be used in the completed brake mechanism, with or without the use of a suitable finely divided abrasive material between the friction surface of the lining and the shoes, so that the brake mechanism when first installed is already "worn in", and will operate with the greatest possible efficiency, since the opposed braking elements will have the maximum area of surface contact. The various steps of my improved process can be performed with a minimum of labor and machinery.

The various steps of my improved process can be performed by hand or by the use of appropriate tools or machines. In the accompanying drawings I have illustrated several ways in which my invention may be carried into effect, and various instrumentalities which may be conveniently employed in carrying out the various steps of my process, selected by me for purposes of illustration, and disclosure, but without limiting myself to the particular forms of apparatus shown. While I have illustrated certain forms of brake drum herein, it is to be understood that the herein described process is applicable to other forms of brake drum, a number of which are shown in my co-pending application hereinbefore referred to.

In the said drawings,

Fig. 1 is a perspective view of the preferred form of brake drum, which is to be provided with a friction lining.

Fig. 2 is a side elevation, partly in section, of a simple device for rotating the drum, to facilitate the formation of the lining by centrifugal action and force, showing a brake drum supported thereon.

Fig. 3 is a view similar to Fig. 2, with the molded lining formed in situ in the drum.

Fig. 4 is a view similar to Fig. 3 showing one means for subjecting the molded lining to pressure in situ, by the aid of centrifugal force.

Fig. 5 is a detail view of a split ring which may be employed as an internal expansible mold member, as shown in Fig. 4.

Fig. 6 is a plan view showing another means for subjecting the lining to pressure in situ.

Fig. 7 is a sectional view illustrating means for smoothing the internal friction face of the lining.

Fig. 8 is a plan view illustrating other means for smoothing the internal friction face of the lining, in this instance in conjunction with the friction surfaces of brake shoes, preferably the identical shoes with which the drum is to be equipped.

Fig. 9 is a vertical sectional view of Fig. 8.

Fig. 10 is a partial perspective view of a modified form of brake shoe.

Fig. 11 is a partial detail perspective view of a grinding or abrading tool in the form of a brake shoe which can be substituted for the brake shoes in the apparatus illustrated in Figs. 8 and 9, to smooth the inner face of the lining.

As shown in the accompanying drawings, particularly in Fig. 1, the brake drum, which is formed of sheet metal, as steel or other suitable metal, and pressed into final form, comprises an attaching portion, in this instance in the form of an annular flange, 1, having a central aperture, 2, and a circular series of apertures, 3, if desired punched in it to facilitate the attachment of the drum to the wheel or hub, and having an annular flange portion, 4, extending substantially perpendicularly from the outer edge of the attaching flange, 1, and stiffened and strengthened by corrugations, as indicated at 5, for example, extending parallel to each other around the axis of the drum, but the corrugations may be spirally arranged or may extend transversely across the flange, 4 and may be of any desired number or shape. The outer edge of the flange, 3, is provided preferably with a lip, 6, extending in this case inwardly to confine, protect and hold the lining at its outer edge, and preferably projecting inwardly a distance equal to the thickness of the lining desired. This lip may be plain or corrugated or may be dispensed with altogether.

The particular composition of the molded lining forms no part of my present invention and may be that of any molded or cast friction lining now in use, or hereafter used, or any other preferred composition suitable for the purpose. The ingredients of such composition are mixed in a more or less finely divided condition, and are more often used in a plastic condition, although they may be used in a comparatively dry or granular condition if desired or in liquid form if molten metal is used.

The flange, 4, may be provided with inwardly extending bumps or projections, as indicated at 10 in Fig. 4, apertures or punch holes, with inwardly or outwardly extending lateral walls, as indicated at 10a in Fig. 2, or with bolts or rivets disposed radially, or transversely, of the flange, as indicated at 10b, and 10c, in Figs. 7 and 3, or the inner surface of the flange, 4, may be roughened in any desired manner, as by knurling, for example, all as set forth in my former application, to further anchor the lining to the flange and prevent relative movement between them.

The material to be used for the lining is applied as hereinafter described to the inner surface of the braking flange, 4, between the lip, 6, and the attaching portion, 1, to the desired thickness, and is forced into the corrugations of the flange so as to form an interlocking engagement therewith.

I have found it convenient to form the molded lining in situ by the aid of centrifugal force, by rotating the drum, in a horizontal position, the plastic, granular liquid, or finely divided composition being forced outwardly by centrifugal action against the flange, 4, of the drum. In Fig. 2, for example, I have shown a rotary table, 30, provided on its upper face with a central circular hub or projection, 31, to fit the central aperture, 2, and pins or studs, 32, to engage some or all of the holes, 3, in the drum body, so that by simply placing the drum on the table in proper position, it will rotate therewith. The table is shown mounted on a driving shaft, 33, supported in a suitable frame, 34, in bearings, one of which is indicated at 35, and it will be understood that the shaft, 33, is driven from any suitable source of power under the control of the operator. A removable shield, 36, may be placed within the drum, over the hub, 31, and studs, 32, and may be given a slightly concavo-convex form, as shown in Fig. 2, to protect the central opening and the studs, 32, and to guide the lining material toward the flange, 4. While the drum is stationary or being rotated at a desired speed, the lining material may be introduced into the drum, and while the drum is rotated the centrifugal force exerted on the lining material will throw it outwardly toward the flange, 4, and will hold it in position, until it can be formed to the proper thickness, as indicated at 7, in Fig. 3. The hands of the operator or suitable tools may be employed to assist the centrifugal force in forming or shaping the lining into the drum.

If centrifugal force is sufficient to bring the lining to the desired shape and density, the drum can be rotated at the speed and for the length of time necessary to accomplish that result. It will also be noted that this operation tends to force the heavier particles toward the outer surface of the lining and the lighter particles toward the inner face, together with any moisture present, which latter, if present, will be evaporated by contact with the air and the material solidified. Molten metal may also be shaped and solidified or cooled in this manner.

It will be understood that an annular molded or cast lining of frictional material is thus formed in situ within the flange, 4, and between the body, 1, and lip, 6, the outer face, 8, of the lining conforming with the inner surface of the drum, even if eccentric or irregular, while the inner face, 9, will be cylindrical and coaxial with the axis of rotation of the drum with the outer friction surface of the brake shoes. It will also be seen that the drum itself forms the exterior mold for the lining. If it is desirable to support the lining in the drum in order to permit it to be moved without injuring the lining before it is completely solidified, I find it convenient to employ an interior mold member, in the form of a simple split elastic ring, 37, of steel or other suitable material, having beveled overlapping ends, 37' (see Fig. 5), which is compressed, inserted within the drum, and permitted to expand into contact with the inner face, 9, of the lining, as shown in Fig. 4. When the expanding ring, 37, is in place, the lining is practically enclosed and protected against injury as it would be in a mold.

It may be desirable to subject certain types of molded composition lining to heat or pressure or both. Where it is desired to compress the lining to consolidate it and bring it into its final form, or before it is cured or vulcanized or heat treated, the lining, 7, may be compressed in situ, outwardly toward the flange, 4, preferably by applying pressure to the inner face of the retaining band, 37, which serves to distribute the pressure and prevent indenting the inner face of the lining. This pressure may be applied by hand or by centrifugal force, or by the use of suitable spreading, wedging, or other hand or power operated tools. I have also found that the necessary outward pressure may be applied to the inner face of the retaining band by centrifugal force, while the drum is being rotated at high speed on a rotary table, as the table, 30, for example. After the band, 37, is inserted, the interior of the drum may be filled with coarse shot or balls, as indicated at 40 in Fig. 4, a cover plate, 41, may be placed over the drum, and secured by snapping its edges over the outer edge of the flange, 4, or otherwise, and by rotating the table at high speed, the shot or balls will be forced outwardly against the band, 35, and compress the lining, 7, substantially uniformly between said band and the drum flange, 4.

In Fig. 6 I have shown a different means for compressing certain types of molded lining in situ. In this figure it will be understood that the drum is supported upon and in engagement with the rotary table, 30, as in Fig. 4. In this instance, however, I provide cover plate, indicated at 41a, on its lower face with a plurality of expanding pressure shoes, 42, 42, somewhat similar to the ordinary internal expanding brake shoes, having beveled overlapping portions at their meeting ends, indicated at 43, and provided with rotary cams, 44, located between the ends of adjacent shoes, and mounted on rotary shafts, 45, journaled in the cover plate, 41a. Each cam shaft, 45, is provided with an operating arm, 46, arranged to swing outwardly and carrying a weight, 47, preferably adjustable thereon by means of a set screw, 48. It will be seen that when the table is rotated, the weighted arms, 46, will tend to move outwardly, thus operating the cams and causing the pressure shoes to exert a greater compression on the lining than can be obtained by centrifugal force alone.

It is sometimes necessary in the manufacture of molded brake linings to subject them to a heat treatment for setting them permanently in the molded form. If the friction composition contains rubber or gutta percha, the heat treatment is a vulcanizing treatment, usually with steam, but in other compositions the heat treatment may be merely the action of dry heat at a predetermined temperature. According to my process the heat treatment of whatever character is applied to the lining in situ, within the drum, which, as before stated, forms a mold member to hold the friction material in its molded form, and the drum may in some instances form the only mold member. However, I contemplate the use of an internal mold member, as for example, the expanding retaining ring, 37, engaging the inner face of the lining and supporting and protecting the same during the heat treatment.

In carrying out the heat treatment the brake drums with the linings formed therein may be conveniently placed on endless conveyors and carried through suitable steam rooms or hot rooms or ovens, the speed of the conveyor being such that the lining within each drum will be given the desired heat treatment during its passage through the steam room, hot room or other heating apparatus, thus curing or hardening the lining in situ within the drum with which it is to be used. The particular type of heat treatment will vary in accordance with the ingredients of the molded lining material. I wish it to be further understood that my invention also includes any other treatment of the lining in situ in the drum for the purpose of curing or hardening the lining including the cooling of molten metals.

After the brake lining is formed and completed in situ, as heretofore described, I prefer to actually wear it in with brake shoes of the kind with which the drum is to be used, and I further prefer to wear in each lining with the identical brake shoes with which it is to be used, after which each brake mechanism including drum and shoes is assembled and ready to be placed in operative position in the automotive vehicle.

If, there are any surface irregularities, on the inner cylindrical surface of the lining, these are ground off. For example, the drum may be returned to a rotating table, as the table, 30, and rotated thereon, while a suitable rotating grinding tool, indicated at 50 in Fig. 7 (or cutting or milling tool, as preferred) mounted on a rotary shaft, 51, carried by a suitable movable or adjustable support, 52, and provided with driving means, as a pulley, 53 and belt, 54, is brought into contact with the inner face of the linings, 7, and brings its surface into a true cylinder.

Finally, the brake drum is assembled with brake shoes, preferably the identical brake shoes with which it is to be used, and relative rotation is established between drum and shoes, a suitable powdered abrasive material being inserted between the friction surfaces of the shoes (which will be the integral smooth metal surfaces thereof, or of a strip of metal or other suitable material applied and secured thereto), and the inner surface of the lining.

In Figs. 8 and 9 I have shown a convenient arrangement for carrying out this step of my process. The drum is supported by and connected for rotation with a rotary table, as the table, 30, in the manner previously described. 60 represents a shoe supporting plate of an internally expanding brake mechanism, which may be of the well known type herein shown, or of any other usual or preferred form of brake mechanism. This plate is provided with a central aperture, 61, to engage a part connected with the adjacent axle member in the automotive vehicle, and with a circular series of bolt holes, indicated at 62, to receive the bolts by which it is secured to the axle member. 63, 63, represent brake shoes of the kind with which the drum is to be used and are preferably the identical shoes which are to be installed in connection with the drum in the automotive vehicle. These shoes are preferably provided with a metallic friction face integral with the shoe, but it will be understood that they may, if desired, be provided with a friction facing of steel or other suitable material to frictionally engage the lining, 7, if desired, and in Fig. 10, for example, I have shown a metal shoe, 63a, provided with a separate friction facing, 63b, riveted or otherwise secured thereto. The brake shoes, 63, are pivotally mounted with respect to the plate, 60, in the usual or any preferred manner. In the drawings I have shown each brake shoe pivotally mounted on a pivot, 64, having an eccentric threaded end, 65, extending through an aperture in the plate, 60, the inner face of which is engaged by a shouldered portion, 66, on the pivot member, the pivot member being rigidly secured to the plate in any desired way, as by nut, 67, or otherwise, which will permit it to be adjusted in a rotary manner to adjust the axis of the pivot away from the other brake member, and in a direction toward the friction face of the drum flange lining, 7, for the purpose of taking up wear when that became necessary. The ends of the eccentric pivot 64 which project beyond the securing nut, 67, may be conveniently made square in cross section, as shown, or otherwise formed to facilitate the rotary adjustment of the pivots when the nuts are loosened. The opposite adjacent ends of the brake shoes engage the usual rotary cam, 68, mounted in the plate, 60, and capable of being rotated by the cam shaft, 69, and the brake shoes are shown provided with the usual retracting springs, indicated at 70. It will be understood that the particular details of construction by which the shoes are adjusted and expanded forms no part of my present invention. 71 represents a supporting hub, provided with a flange, 72, having bolt holes to register with those in the plate member, and a central circular boss, 73, to fit within the central aperture, 61, of the plate, 60, and conforming to the shape of the part connected with the axle member of the vehicle to which the plate, 60, is to be bolted. This hub is provided with means for holding it against rotation, and at the same time permitting it to be moved vertically to permit the brake shoes to be inserted in and removed from the brake drum carried on the table, 30. In this instance I have shown the hub, 71, provided with a square aperture, 74, to receive a square shaft, 75, movable vertically in a stationarily supported guide, 76, above the table, 30, and the hub, 71, is secured to the shaft 75, by a set screw, 77. During the finishing operation, the cam shaft, 69, is provided conveniently with a hand lever, 78, secured thereto by set screw 79, for operating the cam.

It will be understood that the plate, 60, carrying the brake shoes and co-operating parts, which I will term the brake shoe assembly, will be made up in quantity production and one of these brake shoe assemblies is attached to the hub, 71, by bolts, 62, extending through the registering bolt holes of the plate, 60, and hub, 71, and the shaft, 75, is then lowered so that the brake shoes are brought within the lining, 7, of the brake drum in exactly the positions which they would occupy in the finished brake mechanism. The table, 30, is then rotated, and the brake shoes are expanded by means of the hand lever, 78, a suitable abrasive material in powdered form being interposed between the friction surfaces of the shoes, and lining, and the friction surfaces of the shoes and lining are "worn in" until they have the maximum area of surface contact desired for the best brake operation. The shaft, 75, is then raised to permit of the cleaning of the drum and shoes to remove the abrasive material, and to permit the removal of the drum from the table, 30. The plate, 60, is then disconnected from the hub, 71, and inserted in the drum, forming a complete brake assembly, which is now ready to be attached in its proper relation in the automotive vehicle, and is already thoroughly "worn in" and adjusted. The handle, 78, is obviously removed from the cam shaft and the usual cam actuating lever attached thereto.

It will of course be understood that where it is desired the brake shoe assembly illustrated in Figs. 8 and 9 may be permitted to remain connected with the shaft, 75, and used successively to wear in and finish the linings of a plurality of drums successively which, after finishing, can be assembled with other brake shoe assemblies, but obviously there are great advantages in wearing in the brake drum linings with the identical shoes with which the brake drum is to be put into actual use, which advantages will be readily appreciated.

In some instances, instead of grinding the interior face of the lining by means of a rotating tool, as illustrated in Fig. 7, I may provide shoes having a roughened grinding or cutting surface, such as indicated in Fig. 10, for example, in which 81 represents a portion of such a shoe having a roughened surface, 82, somewhat similar to a filing surface, the shoe being hardened in any usual manner. A pair of the shoes, 81, may be substituted temporarily for the shoes, 63, in the brake shoe assembly illustrated in Figs. 8 and 9, or preferably in any brake shoe assembly otherwise identical therewith, and this brake shoe assembly equipped with the brake shoes, 81, and supported against rotation, may be inserted in the drum while on a rotary table, like the table, 30, for example, and the shoes may be expanded while the brake drum is being rotated with the table to preliminarily smooth and true the interior surface of the lining, 7, and before it is worn in, in conjunction with the smooth brake shoe, or the preliminary grinding or smoothing of the interior cylindrical friction surface of the lining, 7, may be performed by hand or by the use of any other usual hand or machine tools suitable for the purpose.

It will be understood that the outer face of the lining, 7, will be interlocked with the corrugated flange, 1, of the brake drum, and with any irregularities of surface which may be provided in the way of projections, indentations or punched holes or roughening of the interior surface of the flange, 4, for the purpose of securing thorough interlocking of the adjacent surfaces of the flange and lining. In some instances it may be deemed desirable to further secure the lining to the flange by means of bolts or rivets extending radially or transversely through the lining, in which case the bolts or rivets may be inserted either before the formation of the lining, which in such case will be molded around the bolts or rivets, while the latter are held in place in the drum in any desired manner, or they may be inserted through the lining by drilling holes therein after the formation and completion of the lining, as may be preferred. In Fig. 3, for example, and for the purpose of illustrating this phase of the matter I have shown the drum provided with transverse bolts, 10c, extending through the body portion 1, and lip, 6, which may be inserted previous to the formation of the lining and afterwards tightened up to clamp the lining more firmly, if desired, between the lip, 6, and the body portion, 1, of the drum. In Fig. 7, for example, I have shown the corrugated flange, 4, of the drum provided with inwardly extending bolts or rivets, 10b, which in this instance are inserted in holes drilled through the flange and lining after the formation thereof, but which could be inserted before the lining is molded. Where the brake drum is perforated, as shown in Fig. 2 for example, it may be necessary to apply a ring or band similar to the ring, 37, shown in Fig. 4, around the outside to prevent loss of brake lining material should it be in such finely divided or liquid form as to be likely to escape through such perforations.

What I claim and desire to secure by Letters Patent is:

1. The process of producing a metallic brake drum provided with a non-metallic lining, which consists in forming a pressed sheet metal brake drum having an annular braking flange provided with portions, the inner and outer faces of which are distorted out of line with other portions of the inner and outer faces of the flange, to stiffen the flange to resist brake pressure, applying to one face of said flange non-metallic friction lining material in moldable condition, and using said flange as an annular mold member, molding said material in situ to form an integral continuous annular friction lining permanently held against said flange and with its flange engaging face interlocked with the distorted portions of the flange, and forming the friction face of said lining truly coaxial with the drum.

2. The process of producing a metallic brake drum provided with a non-metallic lining, which consists in forming a pressed sheet metal brake drum having an annular braking flange provided with portions, the inner and outer faces of which are distorted out of line with other portions of the inner and outer faces of the flange, to stiffen the flange to resist brake pressure and to prevent relative rotation between said flange and non-metallic lining, applying to one face of said flange non-metallic friction lining material in moldable condition, and using said flange as an annular mold member, molding said material in situ to form an integral continuous annular friction lining permanently held against said flange and with its flange engaging face interlocked with the distorted portions of the flange, compacting said lining material against said flange, and forming the friction face of said lining truly coaxial with the drum.

3. The process of producing a metallic brake drum provided with a non-metallic lining, which consists in forming a metallic brake drum having an annular braking flange with a face having portions distorted out of line with other portions of said face to stiffen the flange to resist brake pressure and with other portions extending generally perpendicular to said braking flange, applying to the distorted face of said flange non-metallic friction lining material in moldable condition and using said flange and other portions as an annular mold member, compacting said material in situ to form an integral continuous friction lining permanently locked against said flange and defined by said other portions, and forming the friction face of said lining truly coaxial with said drum.

4. The process of producing a metallic brake drum provided with a non-metallic lining, which consists in forming a pressed sheet metal brake drum having an annular braking flange provided with portions, the inner and outer faces of which are symmetrically distorted out of line with other portions of the inner and outer faces of the flange, to stiffen the flange to resist brake pressure, and provided with projections or indentations in said symmetrical distortions to prevent relative rotation between said lining and flange, applying to one face of said flange non-metallic friction lining material in moldable condition, and using said flange as an annular mold member, molding said material in situ to form an integral continuous annular friction lining permanently held against said flange and with its flange engaging face interlocked with the distorted portions of the flange, and forming the friction face of said lining truly coaxial with the drum.

5. The process of producing a metallic brake drum provided with a non-metallic lining, which consists in forming a pressed sheet metal brake drum having an annular braking flange provided with portions, the inner and outer faces of which are distorted out of line with other portions of the inner and outer faces of the flange, to stiffen the flange to resist brake pressure, and provided with perforations in the distortions for preventing relative rotation between the lining and flange, applying to one face of said flange non-metallic friction lining material in moldable condition, and using said flange as an annular mold member, molding said material in situ to form an integral continuous annular friction lining permanently held against said flange and with its flange engaging face interlocked with the distorted portions of the flange, and forming the friction face of said lining truly coaxial with the drum.

6. The process of producing a metallic brake drum provided with a non-metallic lining, which consists in forming a pressed sheet metal brake drum having an annular braking flange provided with portions, the inner and outer faces of which are distorted out of line with other portions of the inner and outer faces of the flange, to stiffen the flange to resist brake pressure, inserting bolts in said drum, applying to one face of said flange non-metallic friction lining material in moldable condition, and using said flange as an annular mold member, molding said material in situ to form an integral continuous annular friction lining permanently held against said flange and with its flange engaging face interlocked with the distorted portions of the flange and bolts, and forming the friction face of said lining truly coaxial with the drum.

7. The process of producing a metallic brake drum provided with a non-metallic lining, which consists in forming a metallic brake drum having an annular braking flange with a face having portions distorted out of line with other portions of said face to stiffen the flange to resist brake pressure and also provided with flanges perpendicular to the braking flange both of which are utilized to define the lateral limits of the non-metallic lining and one of which is utilized to attach the drum to a rotating part, applying to the distorted face of said flange non-metallic friction lining material in moldable condition and using said braking flange and perpendicular flanges as an annular mold member, compacting said material in situ to form an integral continuous friction lining permanently locked against said flange and defined by said perpendicular flanges, and forming the friction face of said lining truly coaxial with said drum.

8. The process of producing a metallic brake drum provided with a non-metallic lining, which consists in forming a pressed sheet metal brake drum having an annular braking flange provided with portions the inner and outer faces of which are distorted, out of line with other portions of the inner and outer faces of the flange, to stiffen the flange to resist brake pressure, supporting the drum with said flange in a vertical position, introducing non-metallic friction lining material in moldable form into said drum, rotating said drum, and by the aid of centrifugal force, molding said material to form an integral continuous annular lining in situ upon the inner face of said flange, permanently held thereagainst and interlocked with the distorted portions thereof, and forming the inner friction face of the lining coaxial with the drum.

9. The process of producing a metallic brake drum provided with a non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, supporting the drum with said flange in a vertical position, introducing non-metallic friction lining material in moldable form into said drum, and molding said material in situ upon the inner face of said flange to form an integral continuous annular lining permanently held thereagainst and interlocked with the distorted portions thereof, and subjecting the inner face of said lining throughout its annular extent simultaneously to pressure exerted radially toward said flange to condense the lining and form its inner face coaxial with the drum.

10. The process of producing a metallic brake drum provided with a non-metallic lining, which consists in forming a pressed sheet metal brake drum having an annular braking flange provided with portions the inner and outer faces of which are distorted, out of line with other portions of the inner and outer faces of the flange, to stiffen the flange to resist brake pressure, supporting the drum with said flange in a vertical position, introducing non-metallic friction lining material in moldable form into said drum, and molding said material in situ against the inner face of said flange to form an integral continuous annular lining permanently held thereagainst and interlocked with the distorted portions thereof, rotating the drum and lining, and acting simultaneously upon all portions of the inner face of the lining by centrifugally actuated means to condense said lining.

11. The process of producing a metallic brake drum provided with a non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, supporting the drum with said flange in a vertical position, introducing non-metallic friction lining material in moldable form into said drum, and molding said material in situ against the inner face of said flange to form an integral continuous annular lining permanently held thereagainst and interlocked with the distorted portions thereof, inserting in said drum within the said annular lining pressure applying means operable by centrifugal force, and rotating said drum and said pressure applying means to apply pressure to the inner face of said lining and simultaneously in radial directions to all portions of said lining.

12. The process of producing a metallic brake drum provided with a non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, supporting the drum with said flange in a vertical position, introducing non-metallic friction lining material in moldable form into said drum, and molding said material in situ against the inner face of said flange to form an integral continuous annular lining permanently united thereto and interlocked with the distorted portions thereof, inserting in said drum in contact with the inner face of said lining a removable annular mold member expansible longitudinally and rotatable with the drum to protect and support the lining, and subjecting the inner face of said mold member throughout its annular extent simultaneously to radial pressure to conform said lining to the irregular drum and condense said lining.

13. The process of producing a metallic brake drum provided with a non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, supporting the drum with said flange in a vertical position, introducing non-metallic friction lining material in moldable form into said drum, and molding said material in situ against the inner face of said flange to form an integral annular lining permanently held thereagainst and interlocked with the distorted portions thereof, inserting in said drum in contact with the inner face of said lining a removable annular mold member expansible longitudinally by hand or centrifugal force to protect and support the lining, rotating the drum, and acting on the inner face of said mold member simultaneously throughout its annular extent by centrifugally actuated pressure applying means, to condense said lining.

14. The process of producing a metallic brake drum provided with a non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, supporting the drum with said flange in a vertical position, introducing non-metallic friction lining material in moldable form into said drum, and molding said material in situ against the inner face of said flange to form an integral annular lining permanently held thereagainst and interlocked with the distorted portions thereof, inserting in said drum in contact with the inner face of said lining a removable annular mold member expansible longitudinally, to protect and support the lining, inserting in said drum within said mold member pressure applying means operable by centrifugal force, and rotating said drum and centrifugal pressure applying means to apply the pressure simultaneously to said mold member and lining throughout their annular extent to condense said lining.

15. The process of producing a metallic brake drum provided with an integral non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, applying to one face of said flange non-metallic friction lining material in moldable condition, and using said flange as an annular mold member, molding said ingredients in situ thereagainst to form an integral continuous annular friction lining permanently united thereto, having its flange engaging face interlocked with the distorted portions of the flange, forming the friction face of said lining truly coaxial with the drum, and subjecting the drum and said lining in situ thereon to heat treatment to cure said lining.

16. The process of producing a metallic brake drum provided with a non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, applying to one face of said flange non-metallic friction lining material in moldable condition, and using said flange as an annular mold member, molding said ingredients in situ thereagainst to form an integral annular continuous friction lining permanently held thereagainst, having its flange engaging face interlocked with the distorted portions of the flange, and forming the friction face of said lining truly coaxial with the drum, assembling said drum in association with an opposed brake member, establishing relative rotation between said drum and said member, and bringing said opposed member into frictional contact with the friction face of said lining, to wear-in said friction face.

17. The process of producing a metallic brake drum provided with a non-metallic lining, which consists in forming a pressed sheet metal brake drum having an annular braking flange provided with portions the inner and outer faces of which are distorted out of line with other portions of the inner and outer faces of the flange, to stiffen the flange to resist brake pressure, applying to one face of said flange non-metallic friction lining material in moldable condition, and using said flange as an annular mold member, molding said ingredients in situ thereagainst to form an integral annular friction lining permanently held thereagainst having its flange engaging face interlocked with the distorted portions of the flange, and forming the friction face of said lining truly coaxial with the drum, assembling said drum in association with the identical opposed brake member with which it is to be used, establishing relative rotation between said drum and member, and bringing said member into frictional contact with the friction face of said lining to wear in the opposed faces of said lining and said opposed brake member.

CALEB S. BRAGG.